United States Patent
Brungs et al.

(10) Patent No.: US 6,550,526 B1
(45) Date of Patent: Apr. 22, 2003

(54) METHOD AND DEVICE FOR PRODUCING CAST PARTS CONSISTING OF ALUMINIUM AND MAGNESIUM ALLOYS

(75) Inventors: Dieter Brungs, Meschede-Eversberg (DE); Andreas Kessler, Dinslaken (DE); Manfred Dette, Dusseldorf (DE)

(73) Assignee: Honsel GmbH & Co., KG (DE)

( * ) Notice: Subject to any disclaimer, the term of this patent is extended or adjusted under 35 U.S.C. 154(b) by 0 days.

(21) Appl. No.: 09/913,875

(22) PCT Filed: Feb. 16, 2000

(86) PCT No.: PCT/EP00/01255

§ 371 (c)(1),
(2), (4) Date: Nov. 7, 2001

(87) PCT Pub. No.: WO00/48770

PCT Pub. Date: Aug. 24, 2000

(30) Foreign Application Priority Data

Feb. 19, 1999 (DE) .......................... 199 06 939

(51) Int. Cl.[7] .................. B22D 18/04; B22D 27/02; B22D 27/04

(52) U.S. Cl. .................. 164/119; 164/493; 164/499

(58) Field of Search .................. 164/199, 306, 164/493, 513, 499

(56) References Cited

U.S. PATENT DOCUMENTS

| 3,431,345 A | 3/1969 | Faulkner et al. ............... 13/22 |
| 5,397,946 A | 3/1995 | Andoh .................... 164/306 |
| 5,559,827 A | 9/1996 | Shimada et al. ............ 373/142 |
| 5,860,468 A | * 1/1999 | Cook .................... 164/113 |
| 6,004,368 A | * 12/1999 | Chandley et al. ........... 420/418 |
| 6,283,195 B1 | * 9/2001 | Chandley et al. ........... 164/113 |

FOREIGN PATENT DOCUMENTS

| DE | 945780 | 7/1956 |
| DE | 3815828 | 11/1988 |
| DE | 19626175 | 1/1998 |
| EP | 0426350 | 5/1991 |
| EP | 0662361 | 7/1995 |

OTHER PUBLICATIONS

Erfahrungen einer österreichischen Leichtmetallgiesserei mit dem Niederdruck–Kokillenguss, J. Berger, Giesserei, vol. 48, No. 19, Sep. 21, 1961, pp. 548–555.

Das Niederdruck–Kokilleniessverfahren in heutgier Sicht, J. Berger, Giesserei, vol. 56, No. 4, Feb. 13, 1969, pp. 83–90.

Niederdruckgiessanlage für Sand–und Feingussteiel aus Aluminiumlegierungen, Giesserei 72, 1985, Nr. 5, p. 128.

Ein Induktionstiegelofen zum Speichern under Schmelzen von Aluminium mit optimalem Wirkungsgrad für eine Druckgiesserei, J.–P. Figari and M. Ogrissek, Giesserei–Praxis 4, 1992, p. 128.

Verfahrenstechnik beim Druckgiessen von teilchenverstärktem Aluminiumlegierungen, B. M. Cox, Giesserei–Praxis, Nr. 20/1992, pp. 310–315.

Aluminium–Taschenbuch, Herausgeber: Aluminium–Zentrale, Düsseldorf, Verantwroticher Bearhbeiter: W. Hufnagel, unter Mitabeit zahlreicher Fachkollegen, 1983, pp. II, 415–418.

* cited by examiner

*Primary Examiner*—Kuang Y. Lin
(74) *Attorney, Agent, or Firm*—Ostrolenk, Faber, Gerb & Soffen, LLP

(57) ABSTRACT

The invention relates to a crucible induction furnace for producing cast parts consisting of aluminum and magnesium alloys, especially particle-reinforced alloys. According to the invention, the material being melted is directly, inductively heated and stirred in an electrically non-conductive, refractory lining or crucible.

12 Claims, 1 Drawing Sheet

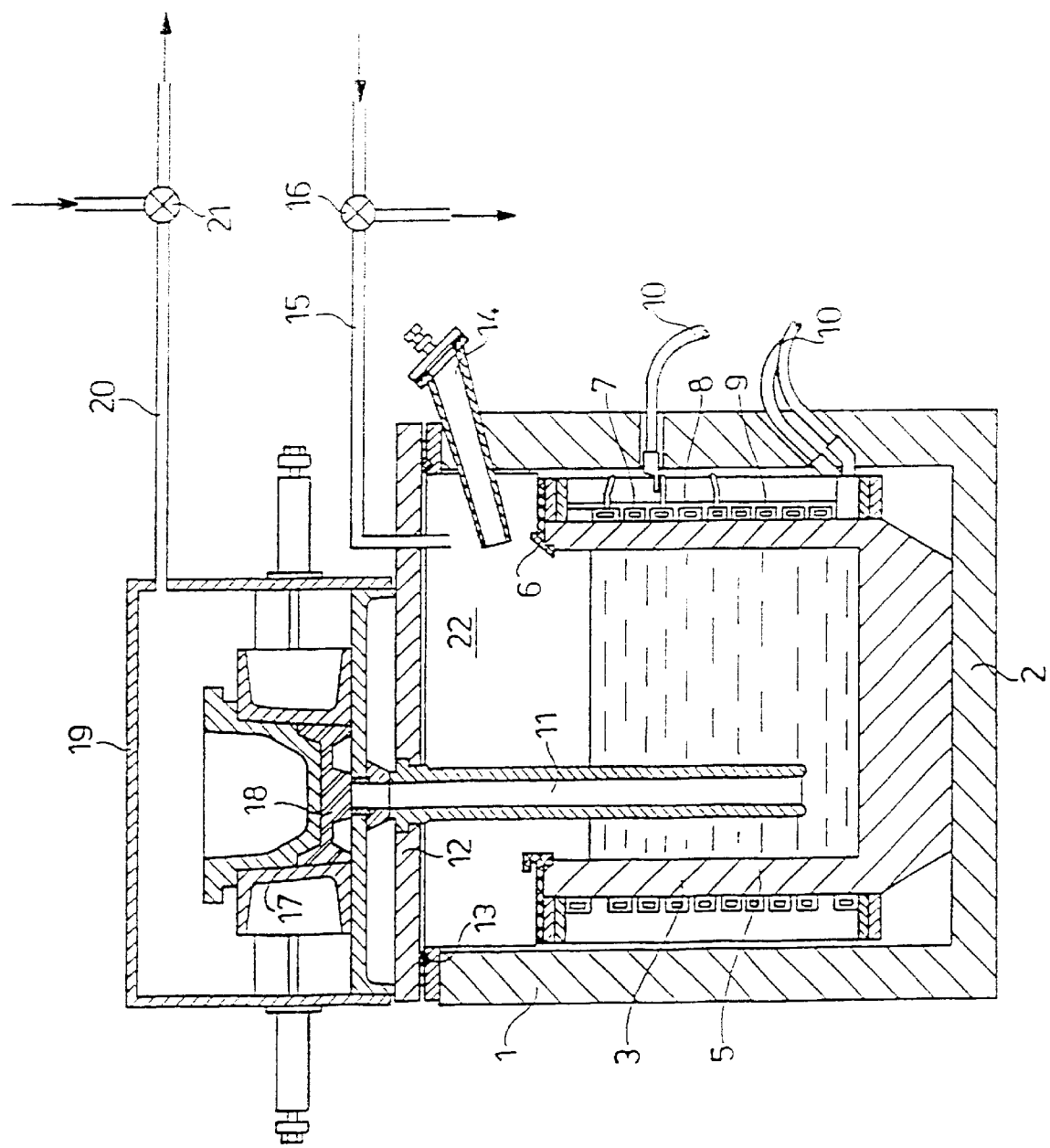

METHOD AND DEVICE FOR PRODUCING CAST PARTS CONSISTING OF ALUMINIUM AND MAGNESIUM ALLOYS

BACKGROUND OF THE INVENTION

1. Technical Field

The invention relates to a method and a device for the production of castings from aluminum hand magnesium alloys and to the use of an induction crucible furnace with sufficient melting and heat retention capacity for the production of castings, in particular from particle-reinforced aluminum and magnesium alloys.

2. Relevant Art

In the casting of particle-reinforced aluminum and magnesium alloys, there is the problem of keeping the particles in suspension in the melt, in order to obtain a homogeneous distribution of the particles in the casting. For this purpose, a continuous movement of the melt is necessary, which prevents the particles from settling.

This is counteracted by the attempt to remove gas and oxide inclusions from the melt or to avoid such inclusions, this being capable of being achieved essentially by keeping the melt as steady as possible and by avoiding turbulences during the casting operation. The low-pressure chill-casting method with fossil or resistance heating or an induction channel is particularly suitable in this respect, since the melt can be steadied in a corresponding furnace and be pressed at low velocity by means of gas pressure through a riser penetrating deep into the melt, into a chill or mold arranged above the melt.

From the paper: "Erfahrungeneiner bsterreichischen Leichtmetallgiesserei mit dem Niederdruck-Kokillenguss" ["Experiences of an Austrian light-metal foundry with low-pressure chill casting"] by Johann Berger, appearing in "Giesserei" ["Casting"], Sep. 21, 1961, and from the paper: "Das Niederdruck-Kokillengiessverfahren in heutiger Sicht" ["The low-pressure chill-casting method at the present time"] by Johann Berger, appearing in "Giesserei" ["Casting"], Feb. 13, 1969, it is clear that the principle of the inductive melting can be adopted in the low-pressure casting of aluminum alloys. The smelting plants described are in each case operated on the double-crucible principle. The electromagnetic field of the (supply-frequency) inductor leads mainly to the heating of only the outer cast-iron crucible. As a result of heat conduction, the graphite crucible located in the cast-iron crucible is likewise heated, with the result that the batch located in this crucible is melted down, in that a transport of energy from the graphite crucible into the metal takes place.

In this application, the cast-iron crucible has the function of being heated as a result of the electromagnetic field of the coil, for which purpose it is intentionally designed to be thick-walled, in order to conduct this induced heat further on to the graphite crucible. The graphite crucible has the function of protecting the aluminum melt from undesirable reactions with the cast-iron crucible. On account of the high outlay, this concept does not constitute the ideal solution and has not found widespread use. The thick-walled cast-iron crucible has the effect that the batch is shielded against the induced currents, so that the bath movement is not sufficient to make it possible to keep the particles in suspension when particle-reinforced light-metal alloys are being melted.

Developments throughout the world are seeking suitable methods and processes for melting and casting particle-reinforced aluminum alloys and are aimed at also using inductive melting in conjunction with suitable crucible materials in order to generate in the melt bath a flow pattern which may be sufficient to keep particles of specific characteristics in suspension.

European Patent Application 0 662 361 and German Laid-Open Publication DE 196 26 175 A1 describe methods and devices for the casting of particle-reinforced aluminum alloys, in which a filling tube with a filling piston is arranged below a mold. A preportioned quantity of casting material is introduced into the filling tube and is subsequently melted down or kept hot by induction; swirling of the melt together with the particle reinforcing material being achieved by virtue of the induction. These are in each case individual melting methods having the disadvantage that the metal to be melted has to be portioned for the respective casting and the method is restricted in terms of its melting capacity, so that material-intensive castings therefore cannot be manufactured. Nor is the productivity of these methods mentioned very high, since the cycle time is composed of the melting time and the solidifying time and is consequently low. In contrast to low-pressure casting, the actual casting is carried out by means of a mechanical piston which presses the melt or the pasty material into the mold from below.

In the lost crucible process (LOC), a fiber crucible is employed, which is destroyed during casting as a result of the mold being filled from below and can consequently be used only for second casting, the efficiency of the method being impaired as a result.

BRIEF DESCRIPTION OF THE INVENTION

The problem on which the invention is based is to achieve as high process reliability as possible, a rapid cycle time and a high output in the production of castings from particle-reinforced aluminum and magnesium alloys, while at the same time ensuring that the material of the castings are as homogeneous as possible. This aim is achieved by the use of an induction crucible furnace for receiving a batch stock which is sufficient for a relatively large number of casting operations, with a lining or a crucible consisting of electrical nonconductive refractory material, with direct However, other casting methods may also be employed, such as, for example, diecasting, squeeze casting, rheo casting and the like.

The invention affords the following advantages, as compared with the prior art:

1. Complicated treatment of the melt by means of mechanical agitation can be dispensed with, as compared with the conventional melting technique for particle-reinforced material.
2. Process management is such that gas and oxide inclusions are reduced, as compared with the previous melting and casting technique for particle-reinforced alloys.
3. As compared with casting with a lost crucible, costs for the crucibles are saved, and the method is more flexible, since the preliminary material used does not have to be only continuous-casting billets.

On the basis of this set problem, it is proposed, furthermore, according to the invention, to use an induction crucible furnace for the manufacture of castings from particle-reinforced aluminum and magnesium alloys, with direct inductive heating of the batch and with an electrically nonconductive refractory lining or crucible.

Induction crucible furnaces with direct inductive heating of the batch contain a batch stock which is sufficient for a relatively large number of casting operations. It has been shown, surprisingly, that, although the movement of the melt brought about by inductive heating is sufficient to keep the particles in suspension in the melt, this movement of the melt is not so intensive that gas or oxide inclusions occur to an increased extent.

The induction crucible furnace may be designed in such a way that the batch in the form of slabs, billets or preliminary materials is introduced and is melted down, so that the induction crucible furnace is used both for melting and for heat retention, or in such a way that preliminary material which is already liquid is introduced and is kept hot and agitated in the induction crucible furnace.

The induction crucible furnace may be designed in such a way that it receives the batch directly, but it is also possible to insert a crucible for the batch into the induction crucible furnace. It is essential, in both cases, that the lining of the induction crucible furnace or the inserted crucible consist of a nonmagnetic, electrically nonconductive, refractive material, so that the generation of heat takes place directly in the batch.

So that the gas pressure necessary for the low-pressure casting method can be applied to the melt surface, the furnace space is closed by means of a closing plate which is sealed off either relative to the induction crucible furnace or relative to the crucible inserted into the furnace space.

The riser fastened to the closing plate consists of nonmagnetic material and may be arranged centrally or preferably in the vicinity of the wall in the region of high induction, so that the field forces of the induction coil ensure an intermixing of the melt even in the riser and the particles remain in suspension even in the riser.

The induction coil may be designed as a full or short coil or so as to consist of a plurality of part coils and may be arranged and connected in such a way that it can be switched on for melting down, for example over the entire height of the furnace space, and for heat retention and agitation only in the lower region of the furnace space.

Furthermore, it is possible to subject the induction coil to a high frequency for melting down, but to a low frequency for heat retention and agitation. Preferably, in this case, the melting-down frequency may be above 500 Hz and the heat retention and agitation frequency may be equal to or lower than 50 Hz.

The casting operation, which is as free of turbulence as possible, can be assisted by subjecting the casting mold to a vacuum, so that only a relatively low excess pressure needs to act on the melt surface.

BRIEF DESCRIPTION OF THE DRAWING

The invention is explained in more detail below by means of an exemplary embodiment illustrated in the single FIGURE of the drawing. The drawing shows a sectional FIGURE through an induction crucible furnace used according to the invention, for use with the low-pressure casting method for the production of castings from particle-reinforced aluminum and magnesium alloys.

DETAILED DESCRIPTION OF THE INVENTION

The induction crucible furnace has an outer furnace casing 1 and a furnace baseplate 2 which serve predominantly for sealing, insulation and protection against contact. Shielding for the field by means of yokes is arranged between the outer furnace casing 1 and the coil. In the exemplary embodiment illustrated, the induction coil consists of three parts 7, 8, 9. The crucible 5 consists of a preferably nonmagnetic and electrically nonconductive material resistant to the melt temperature.

In the exemplary embodiment illustrated, the upper edge of the crucible 5 is sealed off relative to the inner furnace case 3 by means of a crucible seal 6 and, by virtue of appropriate design, inadmissible heating of the structure is avoided. The coil consisting of the parts 7, 8, 9 is subjected to alternating current via cable connections 10, the coil parts 7, 8, 9 being capable of being subjected to alternating current individually, jointly or in various combinations.

A furnace closing plate 12 is placed onto the top edge of the outer furnace casing 1 and is sealed off relative to the furnace space 22 by means of a seal 13. A riser 11, which penetrates into the melt, is fastened to the furnace closing plate 12. This riser 11 preferably consists of an electrically nonconductive and nonmagnetic material and, in the exemplary embodiment illustrated, is arranged in the vicinity of the wall of the crucible 5 in the region of high inductions, although the riser may also penetrate into the crucible 5 centrally.

Arranged laterally in the outer furnace casing 1 is a filling orifice 14 with closure, through which preliminary material in the form of billets, slabs or the like or else preliminary material which is already liquid can be introduced into the crucible 5. A pressure line 15 issues into the furnace space 22 and can be connected to a pressure source or to the free atmosphere by means of a three-way valve 16.

A mold or chill 17, in which a casting 18 is illustrated, is arranged on the furnace closing plate 12. The mold or chill is surrounded completely by a sealed-off cover 19 which can be subjected selectively to a vacuum and to atmospheric pressure via a vacuum line 20 and a three-way valve 21.

For the melting of preliminary material introduced in the form of billets, slabs or the like, with the riser 11 and furnace closing plate 12 raised, all the coil parts 7, 8, 9 are subjected to a frequency higher than 500 Hz, and, at this frequency, the agitating action is not very pronounced, but is sufficient to keep the melt located in the crucible 5 in movement to an extent such that the particles remain in suspension. Preferably, for the heat retention and agitation of the melt, only the lower part 9 of the induction coil is subjected to a low frequency equal to or lower that 50 Hz. At this low frequency, the agitating action is more pronounced, but, by the lower coil part 9 being subjected to current, is restricted to the melt in the lower region of the crucible 5, so that there is no fear of gas inclusions from the furnace space 22 and of any infiltration of oxides from the melt surface. The riser 11 is located in the region of high field forces in the vicinity of the induction coil, so that, even in the riser 11 itself, constant intermixing of the melt with the particles is ensured and, during the casting operation, a homogeneous particle-reinforced aluminum or magnesium alloy flows into the chill 17.

In the exemplary embodiment illustrated, the subjecting of the furnace space 22 to pressure by the pressure line 15 is assisted by the mold or chill 17 being subjected to a vacuum. This purpose is served by the sealed-off cover 19, the interior of which can be subjected to a vacuum via the vacuum line 20 and the three-way valve 21. The casting operation is initiated by the furnace space 22 being subjected to pressure and by the mold of chill 17 being subjected to a vacuum, so that the melt rises in the riser 11 and flows into the mold or chill 17. The filling of mold or chill takes place with as little turbulence as possible and results in the casting 18 illustrated. When the casting 18 has solidified, the three-way valves 16, 21 are connected to the atmosphere so that the still-liquid melt in the riser 11 flows back into crucible 5. The casting 18 is thereafter removed, and a further casting operation can proceed in the same way.

It is not absolutely necessary for the mold or chill 17 to be subjected to a vacuum, this being advantageous only for specific castings and alloys. The invention therefore also extends to the use of an induction crucible furnace for low-pressure casting and other casting methods, for example diecasting methods, squeeze casting, rheo casting and the like.

If the excess pressure in the furnace space 22 is not generated by compressed air, but by means of another gas put under pressure, for example nitrogen or inert gas, it may be advantageous not to conduct this gas into the atmosphere when the three-way valve 16 is changed over, but into a collecting vessel, so that it can be reused.

What is claimed is:

1. A process for preparing a melt of particle-reinforced Al and Mg alloy for low-pressure casting comprising the steps of:

providing an induction crucible furnace having a melting chamber formed of electrically non-conductive, non-magnetic refractory material;

providing an induction coil extending around the outside of the melting chamber;

filling the melting chamber with a batch of stock material which is sufficient for a plurality of casting operations;

subjecting the induction coil to a high frequency of more that 500 Hz for direct inductive heating and melting down of the stock material;

subsequently subjecting the induction coil to a low frequency less than or equal to 50 Hz for heat retention and agitation of the stock material; and maintaining the melted Al and Mg alloy with the reinforcing particles dispersed therein by the low frequency agitation.

2. A process as described in claim 1, wherein:

the induction coil surrounds the entire height of the melting chamber;

the entire length of the induction coil is energized at the high frequency for melting the stock; and only a portion of the induction coil surrounding a lower region of the melting chamber is energized for heat retention and agitation of the stock at the low frequency.

3. A low pressure casting process comprising the steps of:

melting a batch of particle-reinforced Al and Mg alloy stock in a melting chamber, and maintaining the melted stock with the reinforcing particles dispersed therein as described in claim 2; and preparing castings from the melted stock in the melting chamber.

4. A low pressure casting process as described in claim 3, further comprising the steps of:

providing an upwardly extending riser that penetrates into the melted stock in the melting chamber;

providing a casting mold located above the batch stock; and pressuring the interior of the melting chamber to urge the melted stock through the riser to the mold.

5. A low pressure casting process as described in claim 4, wherein the riser is formed of a non-magnetic material, and further comprising the steps of:

positioning the riser off center within the melting chamber at a location of high induction; and securing the riser to a closing plate that seals the melting chamber to prevent excessive heating of the furnace structure.

6. A low pressure casting process as described in claim 5, further comprising the step of minimizing the turbulence of the melted stock as it flows through the riser by subjecting the casting mold to a vacuum.

7. A low pressure casting process comprising the steps of:

melting a batch of particle-reinforced Al and Mg alloy in a melting chamber, and maintaining the melted stock material with the reinforcing particles dispersed therein as described in claim 1; and preparing castings from the melted stock in the melting chamber.

8. A low pressure casting process as described in claim 7, further comprising the steps of:

providing an upwardly extending riser that penetrates into the melted stock in the melting chamber;

providing a casting mold located above the batch stock; and pressuring the interior of the melting chamber to urge the melted stock through the riser to the mold.

9. A low pressure casting process as described in claim 8, wherein the riser is formed of a non-magnetic material, and further comprising the steps of:

positioning the riser off center within the melting chamber at a location of high induction; and securing the riser to a closing plate that seals the melting chamber to prevent excessive heating of the furnace structure.

10. A low pressure casting process as described in claim 9, further comprising the step of minimizing the turbulence of the melted stock as it flows through the riser by subjecting the casting mold to a vacuum.

11. A process as described in claim 1, wherein the melting chamber is comprised of a crucible within the furnace formed of electrically non-conductive, non-magnetic refractory material.

12. A process as described in claim 1, wherein the melting chamber is defined by a lining within the furnace formed of electrically non-conductive, non-magnetic refractory material.

* * * * *